United States Patent [19]

Takimoto et al.

[11] Patent Number: 5,389,192
[45] Date of Patent: Feb. 14, 1995

[54] APPARATUS AND METHOD FOR REMOVING A COATING FROM A COATED LINEAR MATERIAL

[75] Inventors: Hiroaki Takimoto; Hiroshi Suganuma; Junichi Yoshikawa, all of Kanagawa, Japan

[73] Assignee: Sumitomo Electric Industries, Ltd., Osaka, Japan

[21] Appl. No.: 86,876

[22] Filed: Jul. 8, 1993

Related U.S. Application Data

[62] Division of Ser. No. 895,807, Jun. 9, 1992, Pat. No. 5,306,378.

[30] Foreign Application Priority Data

Nov. 25, 1991 [JP] Japan ................................. 3-104741

[51] Int. Cl.$^6$ ............................................. B32B 35/00
[52] U.S. Cl. ...................................... 156/584; 81/9.44; 81/9.51; 7/107; 30/90.1; 30/286; 30/287; 83/397; 83/DIG. 1
[58] Field of Search ................ 156/344, 584; 81/9.4, 81/9.41, 9.42, 9.43, 9.44, 9.51; 29/33 M, 564.6, 564.4, 566.4, 762; 7/107; 30/90.1, 278, 286, 287, 295; 83/397, DIG. 1

[56] References Cited

U.S. PATENT DOCUMENTS

| | | | |
|---|---|---|---|
| 2,102,744 | 12/1937 | Ratcliffe | 30/287 X |
| 3,596,541 | 8/1971 | Bieganski | 81/9.43 |
| 4,130,031 | 12/1978 | Weiner et al. | 30/287 X |
| 4,364,289 | 12/1982 | Sorensen | 81/9.51 |
| 4,455,745 | 6/1984 | Toeppen | 81/9.51 X |
| 4,706,385 | 11/1987 | Iten | 30/286 X |
| 4,745,828 | 5/1988 | Stepan | 81/9.42 X |
| 4,809,566 | 3/1989 | Campanella | 81/9.51 |
| 4,860,427 | 8/1989 | Kawaguchi | 29/564.4 |

FOREIGN PATENT DOCUMENTS

| | | |
|---|---|---|
| 2-93407 | 4/1990 | Japan . |
| 3-61907 | 3/1991 | Japan . |
| 2204454 | 11/1988 | United Kingdom . |

OTHER PUBLICATIONS

Patent Abstract of Japan, JP2273704, vol. 15, No. 37, published on Jan. 29, 1991.
Patent Abstract of Japan, JP2093407, vol. 14, No. 296, published Jun. 26, 1990.
Patent Abstract of Japan, JP3061907, vol. 15, No. 218, Published Jun. 4, 1991.

*Primary Examiner*—Mark Osele
*Attorney, Agent, or Firm*—Cushman Darby & Cushman

[57] ABSTRACT

An object is to provide a coating removing apparatus and method in which it is not necessary to adjust the distance between edges of two, upper and lower, blades. An apparatus for removing a coating from a coated linear material, in which the upper blade is arranged so as to be brought into contact with the coating layer of the coated linear material, by its own weight, with a width in a direction perpendicular to the axis of the coated linear material.

9 Claims, 8 Drawing Sheets

APPARATUS AND METHOD FOR REMOVING A COATING FROM A COATED LINEAR MATERIAL

This is a division of application Ser. No. 07/895,807, filed Jun. 9, 1992, now U.S. Pat. No. 5,306,378.

BACKGROUND OF THE INVENTION

The present invention relates to an apparatus and a method for removing a coating at a desired position from a coated linear material having a coating layer on a core material, such as a coated optical fiber having a coating layer on glass optical fiber.

Optical fiber glass for optical communication is a fragile material having a very small outer diameter of about 125 $\mu$m, so that it is susceptible to influences of mechanical stress and the environment. To protect the glass optical fiber from these influences, glass optical fiber is provided with a coating of a macromolecular material such as silicone, urethane or the like.

In the case where branching of a coated optical fiber or the like is to be carried out in an optical line constituted by a coated glass optical fiber having a coating layer on optical fiber, the coating layer need be removed from the coated optical fiber at a desired position of the coated optical fiber.

As one conventional coating removing technique, an "optical fiber coating removing apparatus" has been disclosed in Japanese Utility Model Unexamined Publication No. Hei-2-3502. This is a technique for removing a coating layer from a coated optical fiber by placing the coated optical fiber in a slot formed by a pair of upper and lower coating removing jigs, bringing blades into contact with the coating layer of the coated optical fiber at sharp angles, and moving the blades relative to the coated optical fiber.

FIG. 15 is a view for explaining the condition of use of an example of the optical fiber coating removing apparatus as disclosed in the above Japanese Utility Model Unexamined Publication No. Hei-2-3502. The coated optical fiber A is placed in grooves 03a and 04a of a pair of upper and lower coating removing jigs 03 and 04. Upper and lower blades 01 and 02 fixed to the jigs are in contact with the coating layer of the coated optical fiber A at sharp angles from upper and lower directions in symmetric positions on the axis of the coated optical fiber A and in a direction perpendicular to the axis of the coated optical fiber A. In this condition, the coating layer is removed by moving the coated optical fiber A in the direction of the arrow a in the drawing or by moving the coating removing jigs in the reverse direction.

In the aforementioned conventional coating removing apparatus, the contact position between the cutting blades and the coated optical fiber is always constant, so that it is sometimes necessary to replace the cutting blades by new ones or polish the edges of the blades. Whenever the cutting blades are replaced or the edges thereof are polished, the positions of the edges of the blades must be adjusted so as to be symmetric by adjusting the distance between the edges of the blades with respect to the coated linear material. Because the coated optical fiber has a particularly small diameter d of 125 $\mu$m, the adjustment is troublesome. Accordingly, much labor is required for the adjustment whenever the blades are replaced or the edges thereof are polished. Consequently, this is inconvenient in use when repeated daily. Furthermore, it is most difficult to adapt the adjustment to the blades through the entire lengths of the edges of the blades, and it is impossible to use the whole edges of the blades effectively.

SUMMARY OF THE INVENTION

It is an object of the present invention is to provide a method and apparatus for removing a coating from a coated linear material to solve the aforementioned problem.

A method according to the present invention is characterized in that two or more separate cutting blades are brought into contact with the coating layer of the coated linear material as an object at sharp angles from two or more directions and with a width in a direction perpendicular to the axis of the coated linear material in different positions on the axis of the coated linear material when the two or more separate cutting blades are closed to one another; the coated linear material is substantially in a curved state in a contact position between the coated linear material and the cutting blades and the two or more cutting blades are set at a smaller distance than the diameter of the coated linear material after removal of the coating in view of the axis of the coated linear material; and the coated linear material is moved along the axis of the coated linear material relative to the cutting blades to thereby remove a part of the coating layer.

In addition, the present invention has been attained to provide an apparatus for removing a coating from a coated linear material, in which the adjustment of the distance between the edges of the blades is not required, and the edges of the blades can be used wholly effectively to thereby solve the aforementioned problem. The apparatus for removing a coating from a coated linear material according to the present invention is characterized in that the apparatus has two, upper and lower, blades which are arranged separately so that when closed to one another, the two blades are brought into contact with the coated linear material as an object at sharp angles between a coating layer of the coated linear material and the two blades from upper and lower directions in different positions on the axis of the coated linear material and with a width in a direction perpendicular to the axis of the coated linear material, and the two blades are moved relative to the coated linear material to thereby remove a part of the coating layer.

Further, the apparatus according to the present invention may be characterized in that the upper blade is arranged so as to be brought into contact with the coated linear material, by its ownweight, with a width in a direction perpendicular to the axis of the coated linear material.

Furthermore, the apparatus according to the present invention may also be characterized in that two covers are provided on the two blades respectively, each of the covers having a groove for passing the coated linear material, a plurality of concave portions and a plurality of convex portions so that the two covers are fitted to each other through the concave and convex portions thereof when the two blades are engaged with each other, each of the grooves and the concave portions having a width smaller than a finger's width.

DETAILED DESCRIPTION OF THE PREFERRED DESCRIPTIONS

Figure 1:
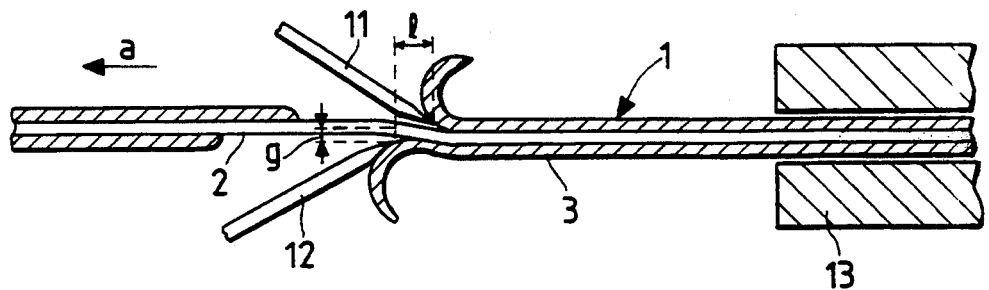
FIG. 1 is a view for explaining the base of a method for removing a coating from a coated linear material according to the present invention.

FIG. 1 is an explanatory view in vertical section showing the base of a coating removing method according to the present invention. In the drawing, the reference numeral 1 designates a coated optical fiber, 2 a naked optical fiber, and 3 a coating layer. The reference numerals 11 and 12 designate blades for cutting a coating, and 13 a guide for holding the coated optical fiber 1.

Figure 2A:
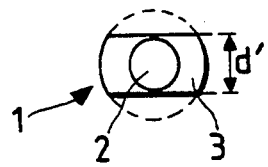
FIG. 2 is a view for explaining various conditions in the coating removing apparatus in FIG. 1, FIG. 2(a) being a cross sectional view of the coated linear material after removing the coating, FIG. 2(b) being a perspective view of a cutting blade, FIG. 2(c) being a view showing the condition of the edges of cutting blades arranged at a negative distance, FIG. 2(d) being a view for explaining the angle change in the curved portion of the coated linear material.
Figure 2B:
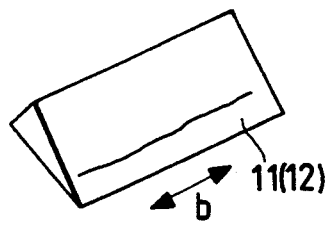

The cutting blades 11 and 12 are shaped as shown in FIG. 2(b). The cutting blades are provided separately by two or more in number (in the drawing, upper and lower separate blades). When engaged with each other, the cutting blades 11 and 12 are brought into contact with the coating layer 3 of the coated optical fiber 1 at sharp angles from two directions and with a width of the blades being in a direction perpendicular to the axis of the coated optical fiber 1 in different positions (1) on the axis of the coated optical fiber. The coated optical fiber 1 is in a curved state as shown in the drawing in the contact position between the coated optical fiber 1 and the cutting blades 11 and 12, so that the distance g between the two cutting blades 11 and 12 in view of the axis of the coated optical fiber 1 is smaller than the diameter d' of the coated optical fiber 1 after the removal of the coating as shown in FIG. 2(a). In this state, a part of the coating layer 3 is removed by the cutting blades 11 and 12 if the not-guided side of the coated optical fiber 1 is pulled in the direction of the arrow a in the drawing. FIG. 2(a) is a cross sectional view showing the coated optical fiber after the removal of the coating layer 3.

As described above, in the conventional technique, it is necessary to adjust the distance between the edges of the two cutting blades to make the cutting blades symmetric with respect to the coated optical fiber. It is troublesome that the adjustment must be made whenever the cutting blades are replaced or polished. On the contrary, in the method according to the invention, the two cutting blades are brought into contact with the coating layer in different positions on the axis of the coated optical fiber, so that the adjustment of the distance between the edges of the two cutting blades is not required. Accordingly, the labor as required for the adjustment in the conventional technique is not required.

A method in which the cutting blades are moved linearly with respect to the edges thereof to reduce replacement of cutting blades can be proposed. Because the entire length of the linear, interrupted edges of the cutting blades can be used effectively by the proposed method, the frequency of adjustment is reduced. In this case, however, the entire length of the edges of the cutting blades need to be adjusted, making the adjustment is more difficult. Even in this case, according to the present invention, the edges of the blades need not be adjusted exactly, so that a small adjustment is required though, as shown by angle changes $\theta$ and $\phi$ in FIG. 2(d).

Figure 2C:
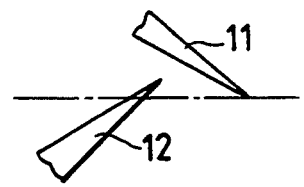
Figure 2D:
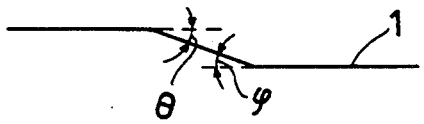

As described above, according to the invention, the distance g between the edges of the two cutting blades in view of the axis of the coated optical fiber is smaller than the diameter d' of the coated optical fiber after the removal of the coating. Stated differently, the sum of the distances from each of the cutting edges of the blades to the axis of the coated optical fiber is less than the diameter of the optical fiber upon which the coating is disposed. Further, the distance can take a negative value as shown in FIG. 2(c).

Figure 3:
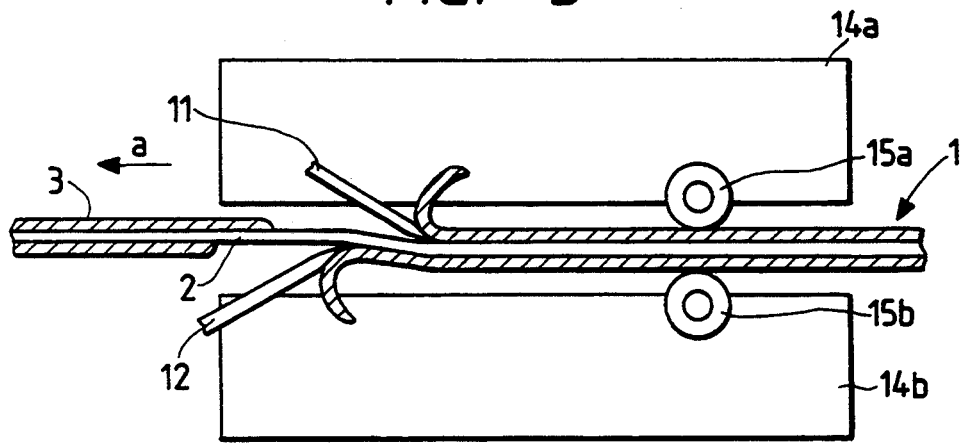
FIG. 3 is a schematic structural view of a first embodiment of the coating removing apparatus used in the coating removing method according to the present invention.

FIG. 3 is a schematic structural view of the first embodiment of a coating removing apparatus used in the coating removing method according to the present invention. In the drawing, the reference numerals 14a and 14b designate an apparatus body having a pair of cutting blades 11 and 12 and a pair of pressing rollers 15a and 15b for holding the coated linear material 1 such as a coated optical fiber therebetween.

The apparatus body is separated into two parts 14a and 14b. When the two parts 14a and 14b are assembled, the cutting blades 11 and 12 are brought into contact with the coated linear material 1 at sharp angles with respect to the coating layer 3 and with a width in a direction perpendicular to the axis of the coated linear material 1 in different positions on the axis thereof. The coated linear material 1 is substantially in a curved state in the contact position between the cutting blades 11 and 12, so that the distance between the edges of the two cutting blades 11 and 12 in view of the axis of the coated linear material 1 is smaller than the diameter of the coated linear material 1 after the removal of the coating. The coated linear material 1 is held between the pair of pressing rollers 15a and 15b in the apparatus body parts 14a and 14b, so that the coating layer 3 is removed by the cutting blades 11 and 12 to expose the core material (naked optical fiber) 2 when the coated linear material 1 is pulled in the direction of the arrow a in the drawing.

Figure 4:
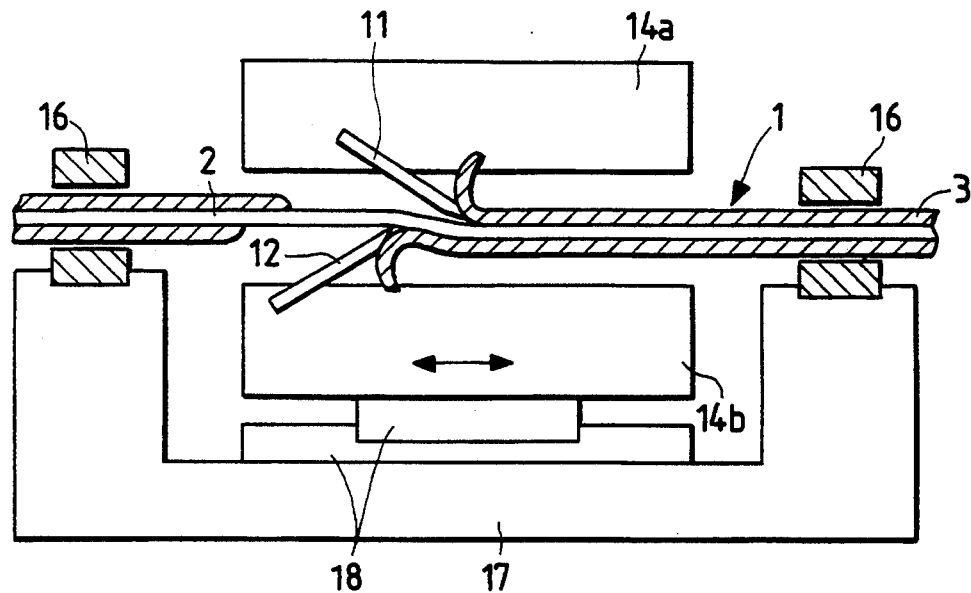
FIG. 4 is a schematic structural view of a second embodiment of the coating removing apparatus used in the coating removing method according to the present invention.

FIG. 4 is a schematic structural view of a second embodiment of the coating removing apparatus used in the coating removing method according to the present invention. In the drawing, the reference numeral 16 designates clamps of the coated linear material 1, 17 a base pad, and 18 a slide mechanism. In this specific embodiment, the apparatus body parts 14a and 14b having cutting blades 11 and 12 attached thereto are mounted on the slide mechanism 18 put on the base pad 17, so that the apparatus body parts 14a and 14b can be moved on the base bad 17 in the direction of the arrow. The clamps 16 are provided in the upper opposite end portions of the base pad 17, so that the coated linear material 1 is held at two positions in the opposite sides of the apparatus body parts 14a and 14b. In the condition shown in the drawing, the coating layer 2 is removed by the cutting blades 11 and 12 through operating the slide mechanism to move the apparatus body parts 14a and 14b to the right in the drawing.

Figure 5:
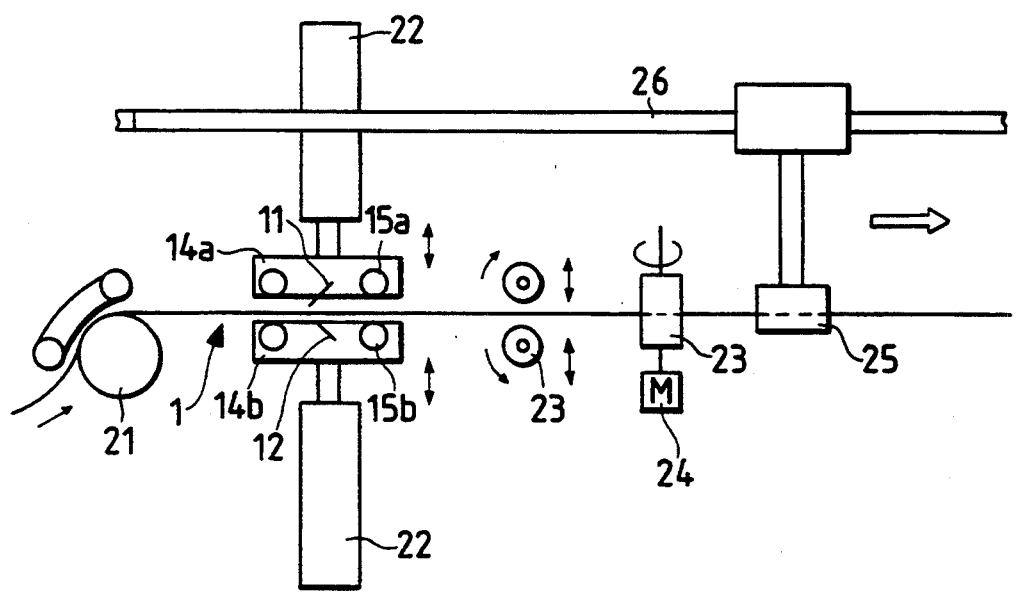
FIG. 5 is a schematic structural view of a third embodiment of an apparatus for automating the coating removing method according to the present invention.

FIG. 5 is a schematic structural view of a third embodiment of an apparatus for automating the coating removing method according to the present invention. In the drawing, the reference numeral 21 designates a capstan for feeding the coated linear material 1 such as a coated optical fiber, 22 a moving device for moving up and down the coating removing apparatus bodies 14a and 14b, 24 a motor for driving a rotating substance of cork, felt or the like, and 25 a clamp mechanism of the coated linear material 1. The clamp mechanism 25 is connected to. a guide bar 26 so as to be movable in the direction of the arrow in the drawing.

The coated linear material 1 fed out from the capstan 21 is clamped by the clamp mechanism 25 and then held by the pressing rollers 15a and 15b while the apparatus body 14a, 14b is moved toward the coated linear material 1 by the moving device 22. At this time, the cutting blades 11 and 12 are brought into contact with the coating of the coated linear material 1 at sharp angles and with a width in a direction perpendicular to the axis of the coated linear material 1 in different positions on the axis of the coated linear material 1. In this condition, a part of the coating layer is removed by the cutting blades 11 and 12 when the clamp mechanism 25 moves in the direction of the arrow in the drawing. The coated linear material 1 after the removal of a part of the coating layer is nipped from the left and right directions and from the upper and lower directions by the rotating substances 23 of cork, felt or the like driven by the motor 24, so the residual coating layer is removed. The coated linear material 1 after the removal of the coating layer is carried to a necessary position by the guide 26.

Figure 6:
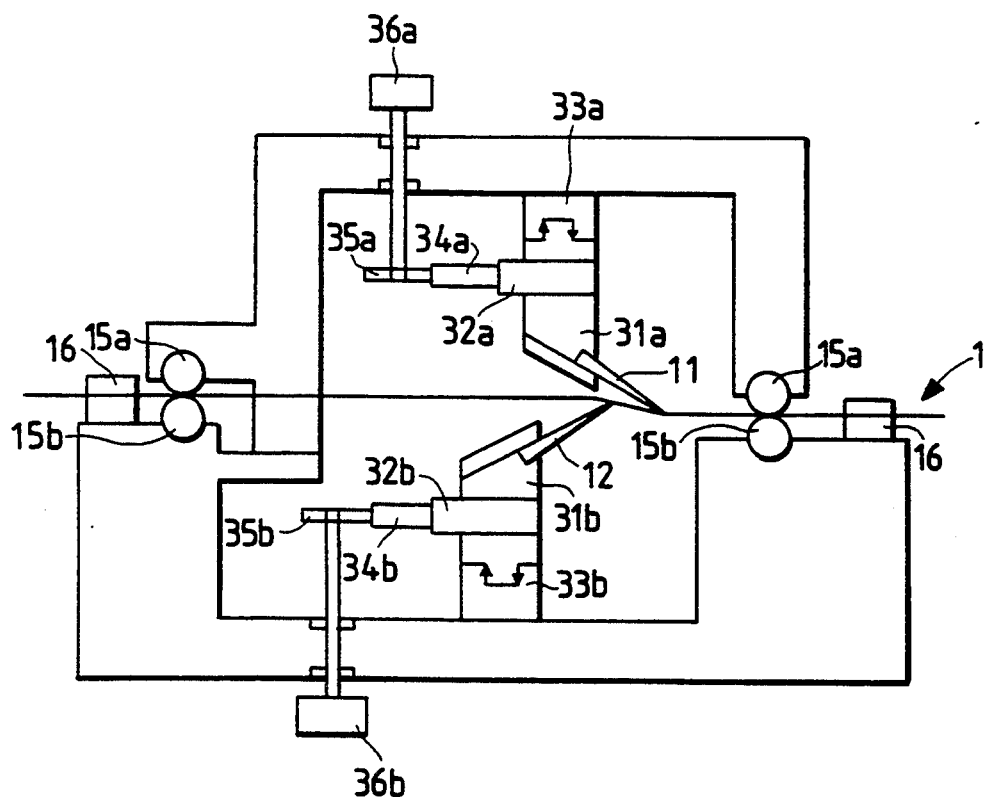
FIG. 6 is a schematic structural view of a fourth embodiment of the coating removing apparatus used in the coating removing method according to the present invention and provided with a mechanism of moving the cutting blades linearly with respect to the edges of the cutting blades.
Figure 7:
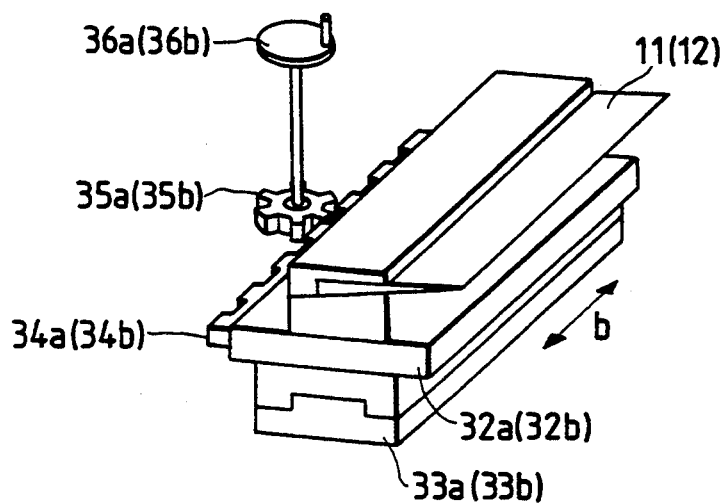
FIG. 7 is a perspective view of an example of the moving mechanism in FIG. 6.

FIG. 6 is a schematic structural view of a fourth embodiment of the coating moving apparatus used in the coating removing method according to the present invention and provided with a mechanism for moving the cutting blades linearly with respect to the edges of the cutting blades, and FIG. 7 is a perspective view of an example of the moving mechanism.

The blades 11 and 12 for cutting the coating are engaged with each other and fixed by holders 31a and 31b, respectively. The holders 31a and 31b are attached to pads 32a and 32b which are arranged so as to be movable in the direction of the arrow b through linear guides 33a and 33b, respectively. The pads 32a and 32b to which the holders 31a and 31b of the cutting blades 11 and 12 are attached are moved linearly with respect to the edges of the cutting blades 11 and 12, that is, in the direction of the arrow b in the drawing, through turning handles 36a and 36b by using racks 34a and 34b provided in side surfaces of the pads 32a and 32b and pinions 35a and 35b engaged with the racks 34a and 34b, respectively. As a result, the contact position between the coating layer of the coated linear material 1 and the cutting blades can be changed so that the entire length of the edges of the blades can be used effectively.

If the quantity of the movement of the respective cutting blade in one cutting procedure is equal to the portion of use of the edge of the blade, that is, equal to the width of the removed coating, a new portion of the edge of the blade can be always used. Because the once used portion of the edge of the blade does not always become unavailable depending on the blade, there is no problem even in the case where the quantity of the movement is smaller than the above value.

As described above, in the method for removing a coating from a coated linear material according to the present invention, the distance between the edges of the blades can be adjusted easily at the time of the replacement of the cutting blades or at the time of the polishing the edges thereof, so that the labor and time required for the adjustment can be largely lightened and shortened.

Even in the case where a mechanism for moving the cutting blades linearly with respect to the edges thereof relative to the coated linear material is additionally provided to use the edges of the cutting blades effectively, the adjustment can be made easily. The present invention is particularly effective when it is applied to removal of an intermediate coating layer in the production of an optical fiber coupler.

Figure 8:
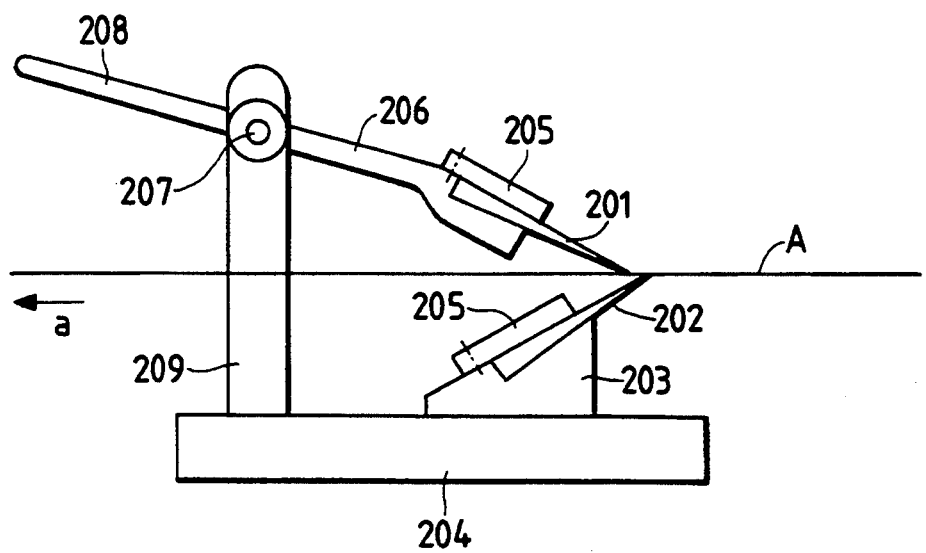
FIG. 8 is a view for explaining a coating removing apparatus as a fifth embodiment of the present invention.

FIG.8 is a view for explaining a coating removing apparatus as a fifth embodiment of the present invention. Although a coated optical fiber having a coating layer on a glass optical fiber will be described hereunder as an example of the coated linear material, it is a matter of course that the coated linear material is not limited to the coated optical fiber.

In the drawings, the reference numeral 201 designates an upper blade and 202 designates a lower blade. The upper blade 201 is fixed through a fixing plate 205 to one end of an upper blade fixing member 206 having the other, opposite end on a shaft 207 provided in an upper portion of a supporting member 209 provided on a base 204 so as to extend from the base 204. A handle 208 is provided in opposition to the upper blade fixing member 206 with respect to the shaft 207. The upper blade 201 fixed to the fixing member 206 is moved up by pushing down the handle 208. The upper blade fixing member 206, the shaft 207 and the handle 208 may be an integrated unit or may be an assembled unit.

The lower blade 202 is located on a fixing member 203 stuck onto the base 204 and is fixed through a fixing plate 205.

When a part of the coating layer is to be removed from the coated optical fiber A by using the above coating removing apparatus according to the present invention, the coated optical fiber A is nipped between the upper and lower blades 201 and 202 while the upper blade 201 is lifted up by pushing down the handle 208. When the handle 208 is released from this state, the upper blade 201 is brought into contact with the coated optical fiber A by its own weight to press down the coated optical fiber A. Here, "its own weight" means a value obtained by subtracting the moment of the handle 208 from the moment of the blade fixing member 206 about the shaft 207, the fixing plate 205 of the upper blade and the upper blade 201. As a result, the upper and lower blades 201 and 202 are in contact with the coated optical fiber A at sharp angles between the coating layer of the coated optical fiber A and the blades 201 and 202 from upper and lower directions and with a width in a direction perpendicular to the axis of the coated optical fiber A. The coating layer can be removed by moving the coated optical fiber A in the direction of the arrow a in the drawing. At this time, the upper and lower blades 201 and 202 may be placed in different positions on the axis of the coated optical fiber A as shown in FIG. 1 or may be placed so as to be symmetric with respect to the axis of the coated optical fiber A.

In the coating removing apparatus according to the present invention, the upper blade 201 is brought into contact with the coated optical fiber A by its own weight to nip the coated optical fiber A. Accordingly, strict adjustment of the distance between the edges of the blades is not required at all. Because the adjustment of the edges of the blades is not required as described above, the whole of the edges of the blades can be used to thereby facilitate effective use of the blades.

In the case where the weight of the upper blade is considerably light, a weight may be provided. In the case where the weight of the upper blade is considerably heavy, the weight of the upper blade may be lightened by changing the form of the upper blade fixing member 206. If protection of the edges of the blades is considered, arrangement of the two blades in different positions on the axis of the coated optical fiber as shown in the drawing may be selected rather than arrangement thereof in symmetric positions with respect to the axis of the coated optical fiber, because there is a case in which the coated optical fiber is not nipped therebetween.

Figure 9:
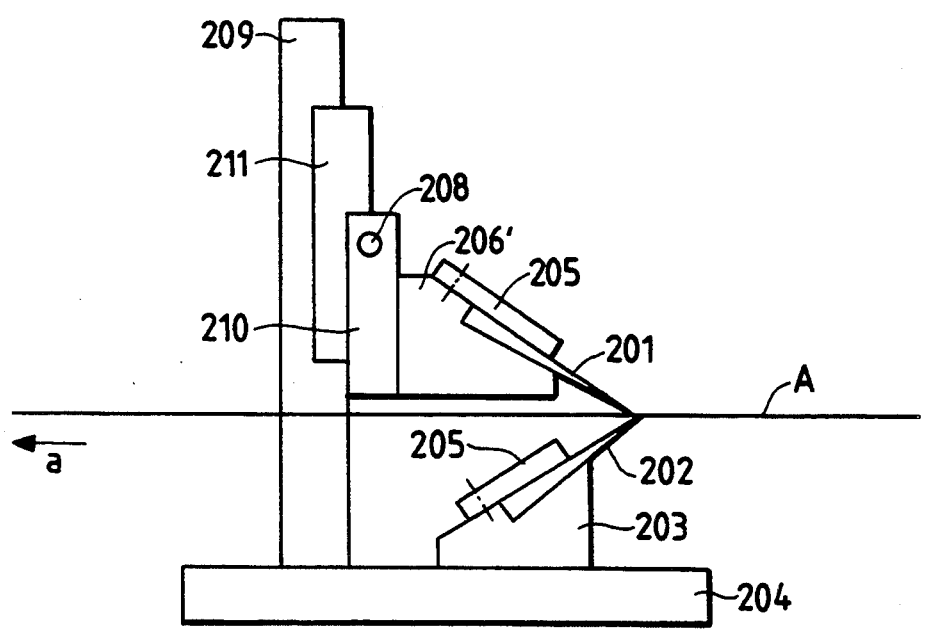
FIG. 9 is a view for explaining the coating removing apparatus as a sixth embodiment of the present invention.

FIG. 9 is a view for explaining the coating removing apparatus a sixth embodiment of the invention. In each of FIGS. 8 and 9, like numerals refer to like parts.

Although FIG. 8 shows the case where rotation by the shaft 207 is used as a mechanism of applying the weight of the upper blade 201, this specific embodiment shows the case where the weight of the upper blade 201 is applied by linear motion. That is, a guide plate 211 is provided so as to be slidable on a side surface of a supporting member 209 provided on a base 204, and an upper blade 201 fixing member 206' is attached to a side portion of a fixing plate 210 having a handle 208 fixed to the guide plate 211.

When an attempt to remove a coating layer from the coated optical fiber A is made, the coated optical fiber A is nipped between the upper and lower blades 201 and 202 while the fixing plate 210 and the guide plate 211 are lifted up by the handle 208. When the handle 208 is then released, the guide plate 211, the fixing plate 210 and the upper blade 201 are moved down by the weight thereof to bring the upper and lower blades 201 and 202 into contact with the coating layer of the coated optical fiber A. The coating layer is removed by moving the coated optical fiber A in the direction of the arrow a. If the weight of the upper blade is too heavy, a method of suspending the upper blade from the upper portion by a spring may be considered.

Figure 10B:
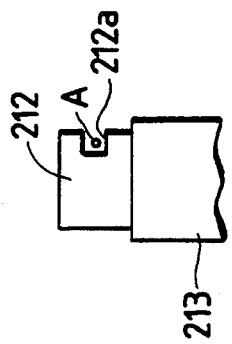
FIG. 10 is a view for explaining the coating removing apparatus as a seventh embodiment of the present invention, FIG. 10(a) being a general view, FIG. 10(b) being a sectional view taken along the line X—X in FIG. 10(a).
Figure 10A:
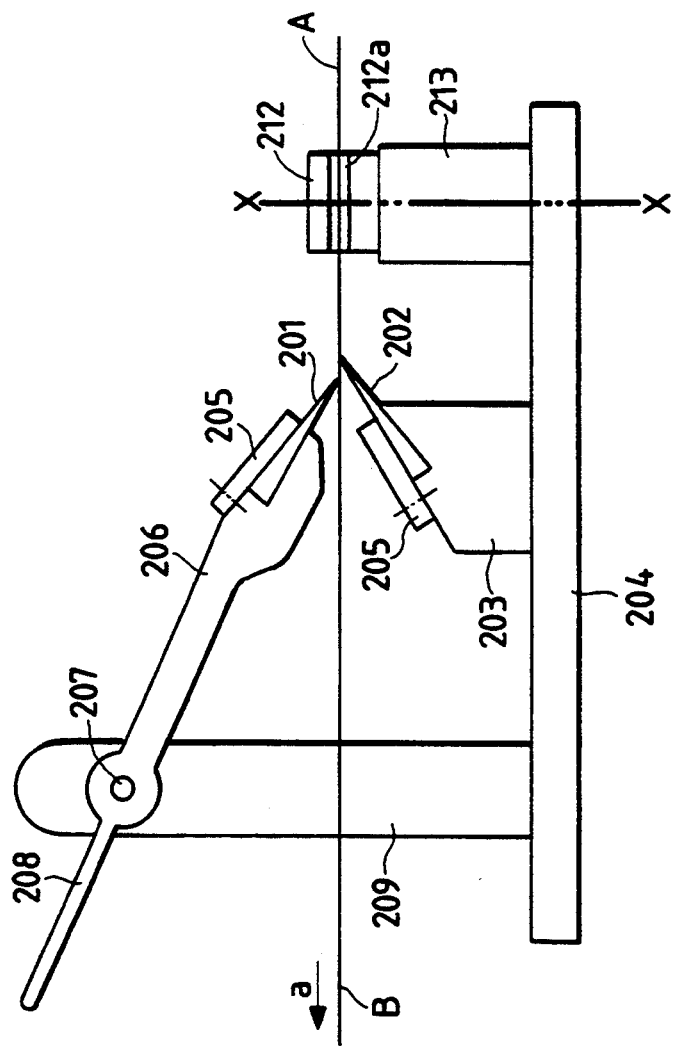

FIG. 10 is a view for explaining the coating removing apparatus as a seventh embodiment of the invention. FIG. 10(a) is a general view, and FIG. 10(b) is a sectional view taken along the line X—X in FIG. 10(b). The coating removing apparatus is the same as shown in FIG. 8, except that an optical fiber guide 212 as shown in FIG. 10(b) is provided so that the coating layer is removed by pulling the coated optical fiber A in the direction of the arrow a through holding the left portion B in the drawing by hand while guiding the coated optical fiber A through a guide groove formed in the guide 212.

In the case where the apparatus is arranged so that the position of the coated optical fiber A can be determined as described above, a moving axis need be provided to a supporting pad 213 so as to be movable toward the edges of the blades for the purpose of using the edges of the blades effectively.

Figure 11:
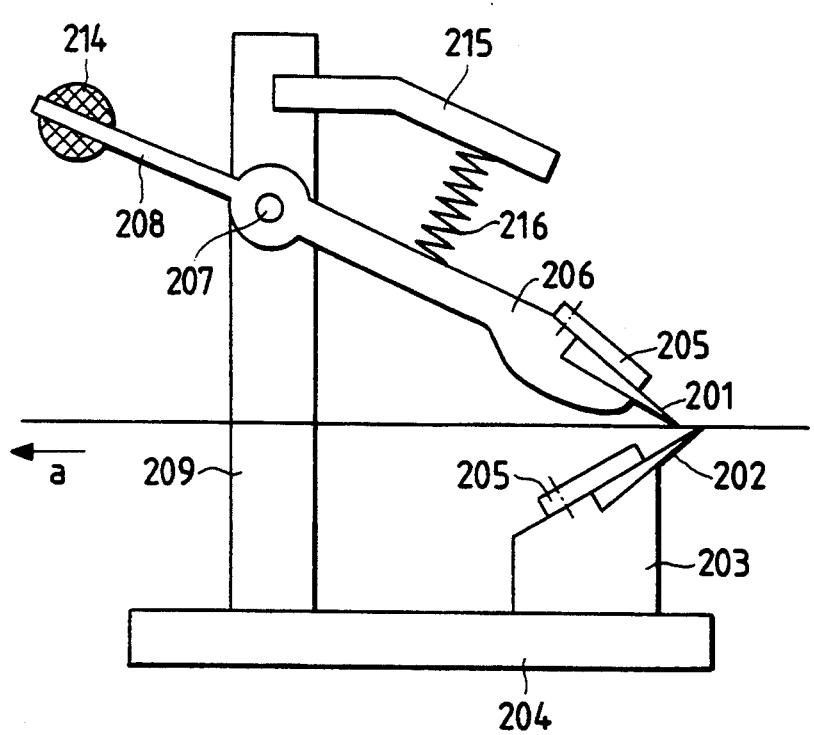
FIG. 11 is a view for explaining the coating removing apparatus as a eighth embodiment of the present invention.
Figure 15:
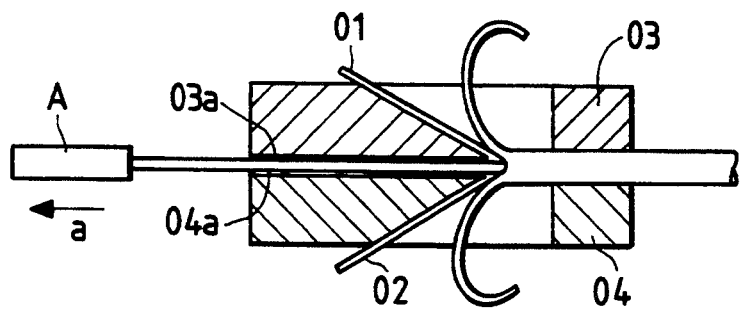
FIG. 15 is a view for explaining an example of a conventional optical fiber coating removing apparatus.

FIG. 11 is a view for explaining the coating removing apparatus as a eighth embodiment of the invention. In this specific embodiment, a balancing weight 214 is attached to the handle 208 and, at the same time, an arm 215 extending laterally is provided in the upper end portion of the supporting member 209 so that a pressing spring is suspended between the arm 215 and the upper blade 211 fixing member 206, for the purpose of adjusting the weight of the upper blade in FIG. 8.

As described above, in the apparatus for removing a coating from a coated linear material according to the present invention, the upper blade is arranged so as to be brought into contact with the coating layer of the coated linear material by its own weight. Accordingly, adjustment of the edges of the blades as required in the conventional technique is not required, so that the blades can be interchanged very easily. Further, effective use of the blades through the whole length of the edges thereof can be facilitated, so that the number of that the blades are interchanged can be reduced which reduces cost.

Figure 12:
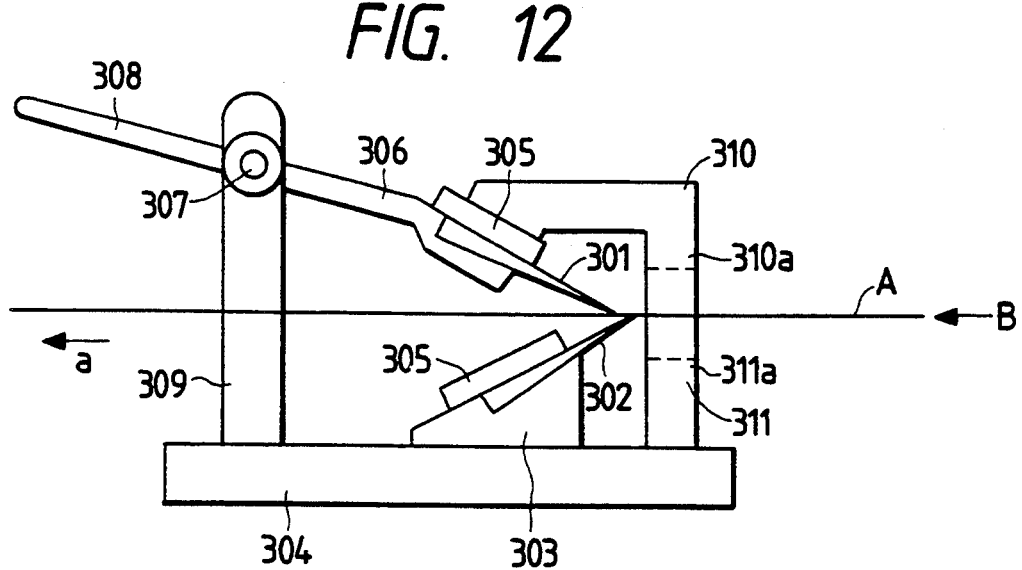
FIG. 12 is a front view of a coating removing apparatus as a ninth embodiment of the present invention.
Figure 13:
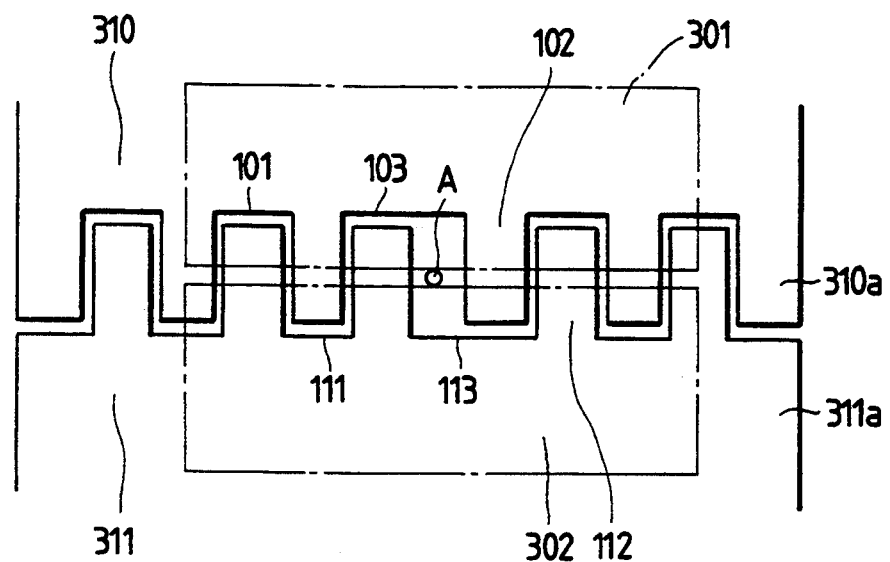
FIG. 13 is a view taken in the direction of the arrow B in FIG. 12.

FIG. 12 is a front view of a coating removing apparatus as a ninth embodiment of the present invention, and FIG. 13 is a view taken in the direction of the arrow B in FIG. 12.

In the drawings, the reference numeral 301 designates an upper blade and 302 designates a lower blade. The upper blade 301 is fixed through a fixing plate 305 to one end of an upper blade fixing member 306 having the other, opposite end on a shaft 307 provided in an upper portion of a supporting member 309 provided on a base 304 so as to extend from the base 304. A handle 308 is provided in opposition to the upper blade fixing member 306 with respect to the shaft 307. The upper blade 301 fixed to the fixing member 306 is moved up by pushing down the handle 308. The upper blade fixing member 306, the shaft 307 and the handle 308 may be an integrated unit or may be an assembled unit.

The lower blade 302 is located on a fixing member 303 stuck onto the base 304 and is fixed through a fixing plate 305.

When a part of the coating layer is to be removed from the coated optical fiber A, the coated optical fiber A is nipped between the upper and lower blades 301 and 302 while the upper blade 301 is lifted up by pushing down the handle 308. When the handle 308 is released from this state, the upper blade 301 is brought into contact with the coated optical fiber A by its own weight to press down the coated optical fiber A. As a result, the upper and lower blades 301 and 302 are in contact with the coated optical fiber A at sharp angles between the coating layer of the coated optical fiber A and the blades 301 and 302 from upper and lower directions and with a width in a direction perpendicular to the axis of the coated optical fiber A. The coating layer can be removed by moving the coated optical fiber A in the direction of the arrow a in FIG. 12. At this time, the upper and lower blades 301 and 302 may be placed in different positions on the axis of the coated optical fiber A as shown in FIG. 12 or may be placed so as to be symmetric with respect to the axis of the coated optical fiber A.

In the aforementioned apparatus, an upper cover 310 having one end stuck to the fixing plate 305 of the upper blade 301 is provided to cover the upper blade 301. A free end 310a of the upper cover 310 faces downward. On the other hand, a lower cover 311 having one end stuck to the base 304 is provided on the base 304. A free end 311a of the lower cover 311 faces to the free end 310a of the upper cover 310.

A plurality of concave portions 101, a plurality of convex portions 102 and a groove 103 for passing the coated optical fiber A are provided in the free end 310a of the upper cover 310, and a plurality of concave portions 111, a plurality of convex portions 112 and a groove 113 for passing the coated optical fiber A are provided in the free end 311a of the lower cover 311. Each of the concave portions 101, 111 and the grooves 103, 113 for passing the coated optical fiber A is formed so as to have a width narrower than a finger's width. As shown in FIG. 13, the upper and lower covers 310 and 311 are formed so that they can be fitted to each other through the concave and convex portions thereof when the coated optical fiber A is nipped between the upper and lower blades 301 and 302.

In the above description, each of the grooves 103 and 113 for passing the coated optical fiber A is made to be widest, but it is preferable to set the groove to be (for example, about 4 mm) narrower than a finger's width.

Figure 14A:
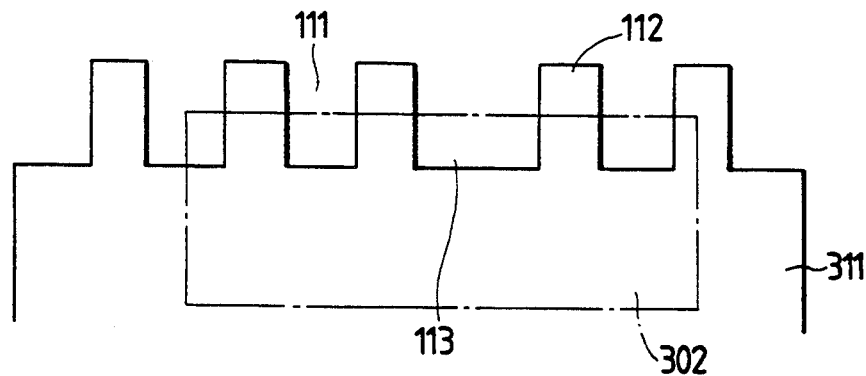
FIG. 14 shows the positional relation between the lower blade 1 and the lower cover 11, FIGS. 14(a) and 14(b) being a front view and a side view respectively.
Figure 14B:
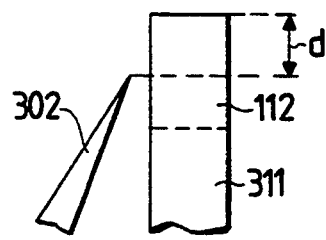

FIG. 14 shows the positional relation between the lower blade 301 and the lower cover 311, FIGS. 14(a) and 14(b) being a front view and a side view respectively.

When the upper and lower blades 301 and 302 are engaged with each other as shown in FIG. 13, the upper and lower covers 310 and 311 are fitted to each other through the concave and convex portions formed at the end portions thereof. As a result, the edges of the upper and lower blades 301 and 302 are covered with the upper and lower covers 310 and 311 perfectly so that the worker can never touch the edges of the blades.

When the upper blade 301 is opened, a state shown in FIGS. 14(a) and 14(b) is established. At this time, the edge of the lower blade 302 is exposed but there is no space to allow a finger or the like to enter from the right of the lower cover 311 in FIG. 14(b) because each of the groove 113 and the concave portions 111 of the lower cover 311 is narrower than a finger's width. Accordingly, the operator's finger can never touch the edge of the blade. Further, because the edge of the blade is placed in a lower position by a distance d than the convex portions 112 of the lower cover 311, the worker's finger can be prevented from touching the edge of the blade from the upper direction.

Figure 16A:
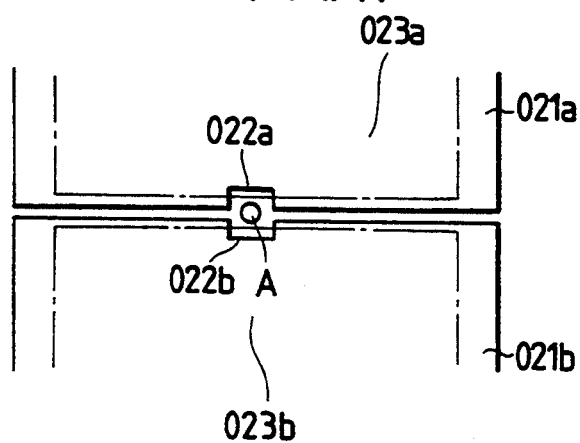
FIG. 16 is a explanatory drawing of a comparative example, FIG. 16(a) being a front view of an important part, FIG. 16(b) being a side view showing the positional relation between the lower blade and the lower cover in FIG. 16(a).
Figure 16B:
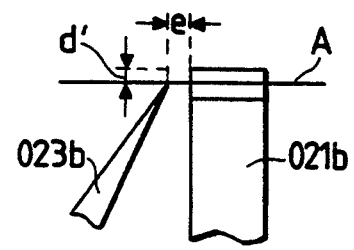

The case where covers 021a and 021b respectively having grooves 022a and 022b for passing the coated optical fiber A as shown in FIG. 16(a) in the same manner as in the coating removing apparatus disclosed in Japanese Utility Model Unexamined Publication No. Hei-2-3502 will be described as a comparative example. FIG. 16(b) is a side view showing the positions of the lower cover 021b and the lower blade 023b in this case.

As shown in FIG. 16(b), the lower cover 021b is placed in the right of the lower blade 023b, so that the worker's finger can never touch the edge of the blade from the right. Because the distance between the upper and lower blades 023a and 023b is 125 μm (optical fiber glass diameter=125 μm), however, the distance d' in the drawing cannot be taken to be larger than 125/2 μm. Because the coating cannot be removed if the lower blade 023b strikes the cover before it strikes the coated optical fiber A, the distance d' need be set to be smaller than 125/2 μm. Accordingly, the distance d' is so small as to be neglected. In the drawing, e represents a distance absolutely necessary for ejecting the removed coating. Accordingly, the worker's finger can touch the edge of the blade from the upper direction in FIG. 16(b).

As described above, in the coating removing apparatus according to the present invention, upper and lower covers each having a groove for passing a coated optical fiber, a plurality of concave portions and a plurality of convex portions are respectively provided for upper and lower blades so that the upper and lower covers can be fitted to each other through the concave and convex portions thereof when the two blades are engaged with each other. Further, each of the grooves, and concave and convex portion is made narrower than a finger's width. Accordingly, the worker's finger can be prevented from touching the edges of the blades from the side and upper directions even in the case where the upper and lower blades are opened. Accordingly, the invention is very effective in that safety can be secured when the invention is applied to a coating removing apparatus used on a daily job site of production.

While the present invention has been described above with respect to preferred embodiments thereof, it should of course be understood that the present invention should not be limited only to these embodiments but various changes or modifications may be made without departure from the scope of the invention as defined by the appended claims.

What is claimed is:

1. An apparatus for removing a coating from a linear material, the linear material having a predetermined diameter upon which the coating is disposed, the apparatus comprising:

first and second blades each having linear, uninterrupted cutting edges, said blades being disposed at different positions with respect to an axis of the coated linear material, said first and second blades being arranged so that said cutting edges are capable of contacting the coated linear material at sharp angles with respect to said axis, said cutting edges having a width disposed in a direction perpendicular to said axis of the coated linear material, and means for moving at least one of said blades, permitting said cutting edges of the blades to contact the coated linear material such that said cutting edges are disposed, with respect to said axis, such that the sum of the distances from each of said cutting edges to said axis is less than the predetermined diameter of the linear material, thereby disposing the coated linear material in a curved state with respect to said cutting edges.

2. An apparatus according to claim 1, further comprising means for moving at least one of said blades in a lateral direction with regard to said axis.

3. An apparatus according to claim 2, wherein said first blade is arranged so as to be brought into contact with said coated linear material, said second blade being stationary with respect to said first blade so that said coated linear material is disposed between said blades.

4. An apparatus according to claim 3, wherein two covers are provided on said two blades respectively, each of said covers having a groove for passing said coated linear material, a plurality of concave portions and a plurality of convex portions so that said two covers are fitted to each other through the concave and convex portions thereof when said two blades are in contact with said coated linear material.

5. An apparatus according to claim 2, wherein two covers are provided, one cover provided on each of said blades, each of said covers having a groove for passing said coated linear material, a plurality of concave portions and a plurality of convex portions so that said two covers are fitted to each other through the concave and convex portions thereof when said two blades are in contact With said coated linear material.

6. An apparatus according to claim 1, wherein said first blade is arranged so as to be brought into contact with said coated linear material, said second blade being stationary with respect to said first blade so that said coated linear material is disposed between said blades.

7. An apparatus according to claim 6, wherein two covers are provided, one cover provided on each of said blades, each of said covers having a groove for passing said coated linear material, a plurality of concave portions and a plurality of convex portions so that said two covers are fitted to each other through the concave and convex portions thereof when said two blades are in contact with said coated linear material.

8. An apparatus for removing a coating from a coated linear material comprising:

first and second blades disposed at different positions with respect to an axis of said coated linear material, said first and second blades being arranged so as to be capable of contacting said coated linear material at sharp angles with respect to said axis said cutting blades having a width disposed in a direction perpendicular to said axis of said coated linear material, and means for moving at least one of said blades, permitting said blades to contact said coated linear material such that said coated linear material is disposed in a curved state with respect to said cutting blades, wherein two covers are provided, one cover provided on each of said blades, each of said covers having a groove for passing said coated linear material, a plurality of concave portions and a plurality of convex portions so that said two covers are fitted to each other through the concave and convex portions thereof when said two blades are in contact with said coated linear material.

9. An apparatus according to any one of claims 1 and 2 through 8, wherein said coated linear material is a coated optical fiber having a coating layer on a glass optical fiber, said blade being arranged to cut said coating layer.

* * * * *